(12) United States Patent
Ryuman (10) Patent No.: US 11,882,254 B2
(45) Date of Patent: Jan. 23, 2024

(54) OPTICAL LINE SENSOR WITH PAIR OF HOLDING MEMBERS SEPARABLY ATTACHED AT ENDS OF ILLUMINATION AND LIGHT RECEIVING UNITS

(71) Applicant: VIENEX CORPORATION, Kagawa (JP)

(72) Inventor: Kazuaki Ryuman, Kagawa (JP)

(73) Assignee: VIENEX CORPORATION, Kagawa (JP)

( * ) Notice: Subject to any disclaimer, the term of this patent is extended or adjusted under 35 U.S.C. 154(b) by 0 days.

(21) Appl. No.: 18/030,481

(22) PCT Filed: Oct. 1, 2021

(86) PCT No.: PCT/JP2021/036485
§ 371 (c)(1),
(2) Date: Apr. 5, 2023

(87) PCT Pub. No.: WO2022/097398
PCT Pub. Date: May 12, 2022

(65) Prior Publication Data
US 2023/0379420 A1    Nov. 23, 2023

(30) Foreign Application Priority Data

Nov. 4, 2020  (JP) ................. 2020-184283

(51) Int. Cl.
*H04N 1/191* (2006.01)
*H04N 1/028* (2006.01)
(Continued)

(52) U.S. Cl.
CPC ......... *H04N 1/191* (2013.01); *H04N 1/02845* (2013.01); *H04N 1/0314* (2013.01);
(Continued)

(58) Field of Classification Search
CPC .. H04N 1/02845; H04N 1/0314; H04N 1/191; H04N 1/1933; H04N 1/1935
See application file for complete search history.

(56) References Cited

U.S. PATENT DOCUMENTS 9,128,217 B2 * 9/2015 Fujiuchi ............. H04N 1/02835
9,386,183 B2 * 7/2016 Ohama ............... H04N 1/02835
(Continued)

FOREIGN PATENT DOCUMENTS

JP        4-334160 A    11/1992
JP         6-98095 A     4/1994
(Continued)

OTHER PUBLICATIONS

PCT/2021/036485, International Search Report and Written Opinion dated Oct. 26, 2021, 6 pages—Japanese, 5 pages—English

*Primary Examiner* — Scott A Rogers
(74) *Attorney, Agent, or Firm* — Andrew F. Young; Nolte Lackenbach Siegel (57) ABSTRACT

An optical line sensor 1 includes an illumination unit 2, a light receiving unit 3, and a pair of holding members 4 separably attached to the light receiving unit 3 at both ends in a main scanning direction. The illumination unit 2 includes fitting portions (protrusions 25) at both ends in the main scanning direction. Each of the holding members 4 includes a fitted portion (hole 41). In a state where the fitting portion and the fitted portion are fitted, the illumination unit 2 is positioned so that the irradiation optical axis of light emitted from the illumination unit 2 overlaps the light receiving optical axis at a position substantially coinciding with a reading line of the light receiving unit 3 and is integrally held with the light receiving unit 3.

8 Claims, 9 Drawing Sheets

(51) Int. Cl.
*H04N 1/193* (2006.01)
*H04N 1/031* (2006.01)

(52) U.S. Cl.
CPC ......... *H04N 1/1933* (2013.01); *H04N 1/1935* (2013.01); *H04N 2201/0081* (2013.01)

(56) References Cited

U.S. PATENT DOCUMENTS

| | | | | |
|---|---|---|---|---|
| 9,456,105 | B2 * | 9/2016 | Matsui | H04N 1/02895 |
| 9,524,996 | B2 * | 12/2016 | Fujiuchi | H01L 27/14618 |
| 9,531,903 | B2 * | 12/2016 | Fujiuchi | H04N 1/0315 |
| 10,021,265 | B2 * | 7/2018 | Fujiuchi | H04N 1/0306 |
| 10,911,632 | B2 * | 2/2021 | Matsuzawa | H04N 1/1295 |
| 2016/0037011 | A1 | 2/2016 | Fujiuchi et al. | |
| 2019/0356809 | A1 * | 11/2019 | Yamada | G03B 27/54 |

FOREIGN PATENT DOCUMENTS

| | | | | |
|---|---|---|---|---|
| JP | 2009-272215 | A | 11/2009 | |
| JP | 6049859 | | 12/2016 | |
| WO | WO-2014129549 | A1 * | 8/2014 | H04N 1/02835 |

* cited by examiner

OPTICAL LINE SENSOR WITH PAIR OF HOLDING MEMBERS SEPARABLY ATTACHED AT ENDS OF ILLUMINATION AND LIGHT RECEIVING UNITS

CROSS REFERENCE TO RELATED APPLICATIONS

This application relates to and claims priority from PCT Ser. No.:PCT/JP2021/036485 filed Oct. 1, 2021, the entire contents of which are incorporated herein by reference, which in turn claims priority to JP Ser. No.:2020-184283 filed Nov. 4, 2020.

TECHNICAL FIELD

The present invention relates to an optical line sensor that reads a reading target object conveyed in a sub-scanning direction.

BACKGROUND ART

The optical line sensor obtains image information by irradiating a reading target object with irradiation light emitted from a light source, and imaging light reflected by the reading target object or transmitted through the reading target object on photoelectric conversion elements arranged in a line through an imaging optical system such as a lens. Depending on the product form, there are an optical line sensor that does not include a light source and an optical line sensor that integrally includes a light source. When the optical line sensor not including a light source is used, it is necessary to appropriately select and separately prepare the light source, and separately prepare a light source-dedicated installation table for adjusting and installing the light source at an appropriate position, which generally takes time and effort. On the other hand, the optical line sensor integrally including a light source has an advantage of not requiring such time and effort.

In order to obtain image information that is easy to perform image processing, the angle of irradiation of the reading target object with light is frequently adjusted and changed in accordance with the type of the reading target object and the content to be read. For example, for an inspection target object having a small diffusivity, the angle between the light receiving optical axis and the irradiation optical axis of the light source is decreased, and for an inspection target object having a large diffusivity, the diffused reflection light is appropriately received according to the characteristic of the inspection target object by increasing the angle, and the detection accuracy of the surface characteristic and the defect of the inspection target object can be improved.

The user often inspects an inspection target object having various diffused reflection characteristics, and in that case, the irradiation angle needs to be changed.

PRIOR ART DOCUMENT

Patent Document

Patent Document 1: Japanese Patent No. 6049859

SUMMARY OF THE INVENTION

Problems to be Solved by the Invention

Patent Document 1 discloses an optical line sensor integrally including a light source and capable of changing a light irradiation angle. In order to change the irradiation angle, it is necessary to change the housing (second housing) of the light source unit and changing the housing at the time of manufacturing by a manufacturer is assumed. Therefore, the user cannot change the angle of irradiation of light.

The invention of the present application has been made to solve the above-described problem, and an object of the invention is to provide an optical line sensor in which a user can change a light irradiation angle with respect to a reading target object.

Means for Solving the Problems

An optical line sensor according to the invention of the present application is an optical line sensor that reads, by a reading line extending in a main scanning direction, a reading target object conveyed in a sub-scanning direction, and includes an illumination unit, a light receiving unit, and a pair of holding members. The illumination unit irradiates the reading target object with light. The light receiving unit receives light emitted from the illumination unit and reflected by the reading target object along a light receiving optical axis or transmitted through the reading target object along the light receiving optical axis, photoelectrically converts the light, and outputs the light as an electric signal. The pair of holding members are separably attached to the light receiving unit at both ends in the main scanning direction. The illumination unit has fitting portions at both ends in the main scanning direction. Each of the pair of holding members has a fitted portion to be fitted with the fitting portion of the illumination unit. In a state where the fitting portion is fitted to the fitted portion, an irradiation optical axis of light emitted from the illumination unit overlaps the light receiving optical axis at a position substantially coinciding with the reading line. According to this configuration, when another holding member having a different fitted portion is prepared and replaced, the light irradiation angle can be finely changed.

Each of the pair of holding members may include at least two of the fitted portions. In this case, even in a state where the fitting portion is fitted to any of the fitted portions, the irradiation optical axis of light emitted from the illumination unit overlaps the light receiving optical axis at a position substantially coinciding with the reading line. According to this configuration, when the fitting portion is fitted to one fitted portion selected from at least two fitted portions, the light irradiation angle can be changed without replacement of the holding member.

Each of the pair of holding members may have a connection hole connecting the at least two fitted portions to each other, and the fitting portion may be movable to each fitted portion via the connection hole. According to this configuration, the light irradiation angle can be changed just by moving the fitting portion through the connection hole without removing the illumination unit with respect to the holding member.

The fitting portion may be slidably fitted to the fitted portion within a predetermined range, and the fitting portion may be fixable at an optional position within the predetermined range. In this case, even in a state where the fitting portion is fixed to the fitted portion at any position within the predetermined range, the irradiation optical axis of light emitted from the illumination unit overlaps the light receiving optical axis at a position substantially coinciding with the reading line. According to this configuration, the light irradiation angle can be changed just by sliding and fixing the fitting portion to an optional position within the predetermined range without removing the illumination unit with respect to the holding member.

Each of the pair of holding members may be attached to the light receiving unit via a light receiving position adjustment mechanism for adjusting the position of the light receiving unit in the light receiving optical axis direction. According to this configuration, the position of the reading line can be adjusted along the light receiving optical axis direction.

Each of the pair of holding members may be attached to the illumination unit via an irradiation position adjustment mechanism for adjusting the position of the illumination unit in the irradiation optical axis direction. According to this configuration, the position of the illumination unit with respect to the reading line can be adjusted along the irradiation optical axis direction.

The light receiving unit may include an imaging optical system, a light receiving element, a light receiving substrate, and a light receiving housing. The imaging optical system images light emitted from the illumination unit and reflected by the reading target object along the light receiving optical axis or transmitted through the reading target object along the light receiving optical axis. The light receiving element receives light imaged by the imaging optical system, photoelectrically converts the light, and outputs the light as an electric signal. The light receiving element is mounted and energized on the light receiving substrate. The light receiving housing integrally holds the imaging optical system and the light receiving substrate. The imaging optical system may be a lens array in which erecting equal magnification imaging lenses are arranged in an array, and a working distance of the lens array may be 30 mm or greater. According to this configuration, contact with the lens array can be prevented when the reading target object is conveyed.

The lens may be a refractive index distribution rod lens.

Effects of the Invention

According to the invention of the present application, a user can change a light irradiation angle with respect to a reading target object.

MODE FOR CARRYING OUT THE INVENTION

1. First Embodiment

Figure 1A:
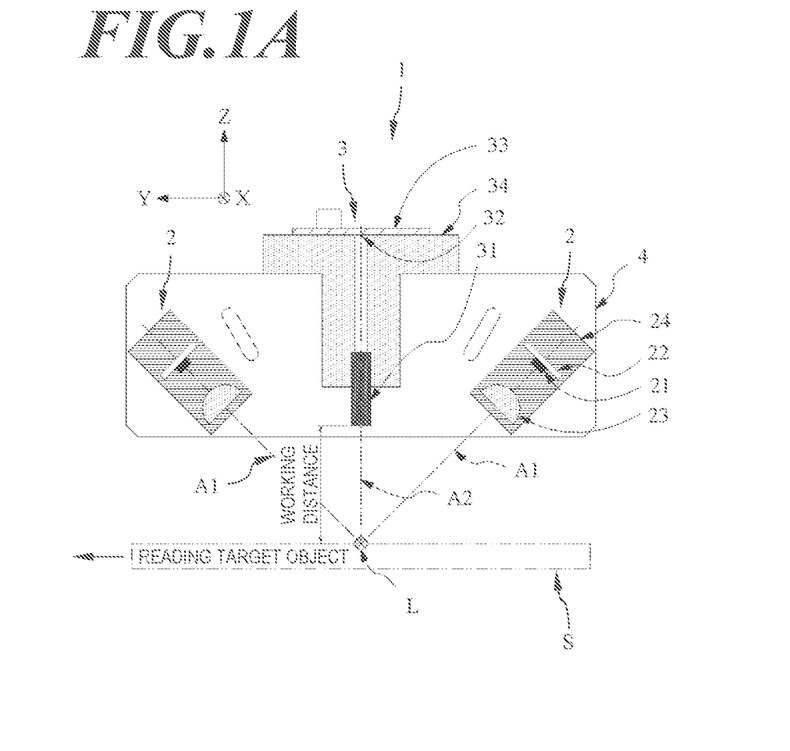
FIG. 1A is a sectional view schematically showing an overall configuration of an optical line sensor according to a first embodiment.
Figure 1B:
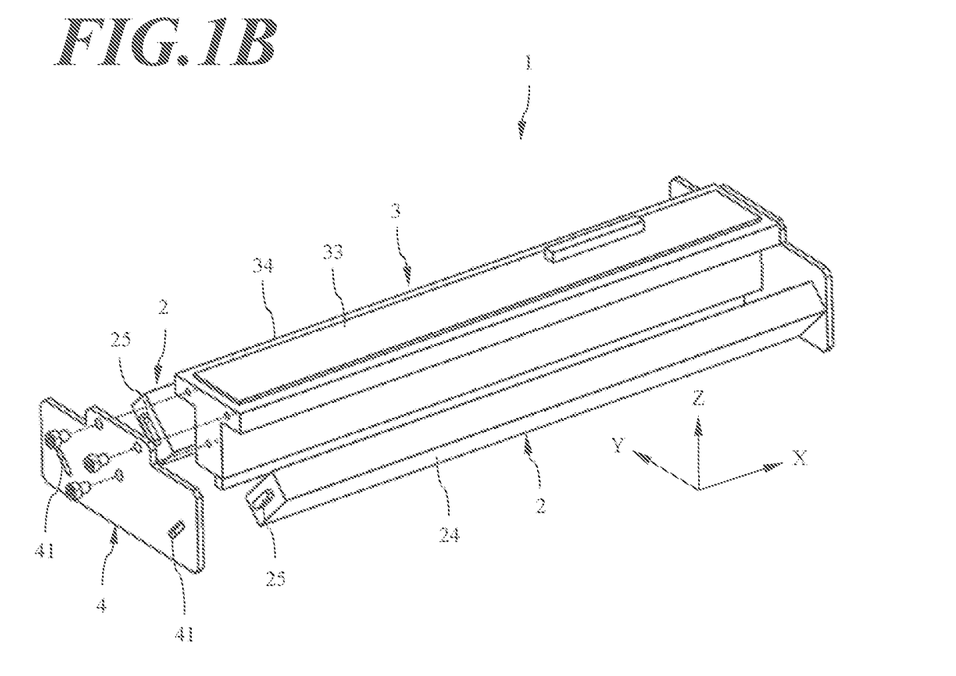
FIG. 1B is an exploded perspective view of the optical line sensor according to the first embodiment.

First, an overall configuration of an optical line sensor 1 according to the first embodiment of the invention of the present application will be described with reference to FIGS. 1A and 1B. FIG. 1A is a sectional view schematically showing the overall configuration of the optical line sensor 1 according to the first embodiment. FIG. 1B is an exploded perspective view of the optical line sensor 1 according to the first embodiment. The optical line sensor 1 obtains image information by reading, by a reading line L extending in a main scanning direction, a reading target object S conveyed in a sub-scanning direction. Hereinafter, the main scanning direction is described as an X direction, the sub-scanning direction (conveyance direction of the reading target object S) is described as a Y direction, and a direction perpendicular to X and Y is described as a Z direction.

The optical line sensor 1 includes an illumination unit 2, a light receiving unit 3, and a pair of holding members 4. The illumination unit 2 has an elongated shape along the X direction and irradiates the reading target object S with light along an irradiation optical axis A1 perpendicular to the X direction. The light receiving unit 3 has an elongated shape along the X direction, receives light emitted from the illumination unit 2 and reflected by the reading target object S along a light receiving optical axis A2 perpendicular to the X direction, photoelectrically converts the light, and outputs the light as an electric signal. The pair of holding members 4 are separably attached to the light receiving unit 3 at both ends in the X direction. The light receiving optical axis A2 is, for example, perpendicular to the reading target object S and parallel to the Z direction. On the other hand, the irradiation optical axis A1 is inclined with respect to a direction (Z direction) perpendicular to the reading target object S, for example. While the inclination angle of the irradiation optical axis A1 with respect to the Z direction is not particularly limited, it is preferably within a range of 10 to 80°, for example, more preferably within a range of 20 to 70°, and still more preferably within a range of 30 to 60°.

Here, two illumination units 2 are provided and arranged symmetrically with respect to the light receiving optical axis A2, but the present invention is not limited to this, and for example, only one illumination unit 2 may be provided. Hereinafter, in the optical line sensor 1 provided with the two illumination units 2, the configuration and the assembly structure of one illumination unit 2 will be described, but the other illumination units 2 have similar configuration and assembly structure.

The illumination unit 2 includes a plurality of LEDs 21, an LED substrate 22, a condenser lens 23, and an illumination housing 24. The plurality of LEDs 21 are examples of a light source and emit light along the irradiation optical axis A1 parallel to one another. The LED substrate 22 has an elongated shape along the X direction, and the plurality of LEDs 21 are mounted in an array in the X direction and energized. That is, the LED substrate 22 constitutes an irradiation substrate on which the light source is mounted and energized. The condenser lens 23 condenses and emits light incident from each LED 21. The illumination housing 24 has an elongated shape along the X direction, and integrally holds the LED substrate 22 and the condenser lens 23 at a predetermined position. The irradiation optical axis A1 is an optical axis of the LED 21 or the condenser lens 23. Since the LED 21 generates a large amount of heat together with light and thus requires heat dissipation, the LED substrate 22 and the illumination housing 24 are formed of a material having high thermal conductivity. For example, the LED substrate 22 and the illumination housing 24 are preferably formed of an aluminum alloy from the viewpoint of specific gravity, rigidity, and cost.

In a case of reading the reading target object S moving at a high speed, it is necessary to shorten the time (i.e., exposure time) for reading one line, and it is necessary to increase the illumination intensity. When the current flowing through each LED 21 is increased, the illumination intensity can be increased, but the heat generated by each LED 21 is also increased. In this case, heat dissipation may be enhanced by providing the illumination housing 24 with a heat dissipation portion (not illustrated) having a fin-like shape. The heat dissipation portion may be provided integrally with the illumination housing, or may be provided by attaching a separate body. Each of a plurality of fins provided in the heat dissipation portion preferably has a shape and arrangement extending vertically upward so that air heated by natural convection easily moves vertically upward. More preferably, a fan is provided to cause forced convection around the fins.

The light receiving unit 3 includes an imaging optical system 31, a plurality of light receiving elements 32, a light receiving substrate 33, and a light receiving housing 34. The imaging optical system 31 images light emitted from the illumination unit 2 and reflected by the reading target object S along the light receiving optical axis A2. The plurality of light receiving elements 32 receive light imaged by the imaging optical system 31, photoelectrically converts the light, and outputs the light as an electric signal. The light receiving substrate 33 has an elongated shape along the X direction, and the plurality of light receiving elements 32 are mounted side by side in the X direction and energized. The light receiving housing 34 has an elongated shape along the X direction, and integrally holds the imaging optical system 31 and the light receiving substrate 33 at a predetermined position. The light receiving optical axis A2 is an optical axis of an imaging element constituting the imaging optical system 31, and a line in which an infinite number of focal points of the imaging element on the light receiving optical axis A2 are collected in the X direction is the reading line L.

Figure 1C:
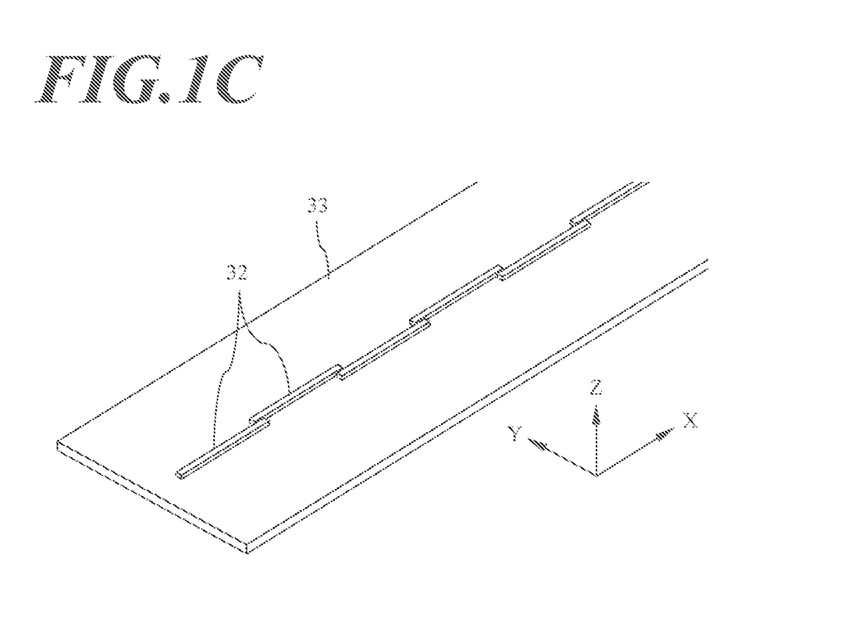
FIG. 1C is a perspective view of a light receiving substrate according to the first embodiment.

FIG. 1C is a perspective view of the light receiving substrate 33 according to the first embodiment. In mounting the plurality of light receiving elements 32 side by side in the X direction on the light receiving substrate 33, the light receiving elements 32 are generally arranged in a straight line. However, in a case where a resolution of 600 dpi or greater is required, a dead zone is formed between the light receiving elements 32 (joint). In order to avoid this, the light receiving elements 32 may be staggered (zigzag manner) as shown in FIG. 1C, and the light receiving elements 32 may be mounted in the X direction with the ends in the X direction overlapping each other. However, in this case, image information deviated in the Y direction and overlapping in the X direction can be obtained, and thus it is preferable to provide a correction means. For example, there is a method in which a reference chart is read in advance, a deviation amount in the Y direction and the overlap amount in the X direction are calculated and stored in the correction means, at the time of reading the image, the output coordinate of the image is corrected with respect to the stored deviation amount, the correction processing is performed by the means for eliminating overlap to change the coordinate value to an appropriate coordinate value, and then the image is output as an image.

As the imaging optical system 31, it is preferable to use a lens army in which erecting equal magnification imaging lenses are arranged in an array, and it is more preferable to use a rod lens array in which erecting equal magnification imaging rod lenses of a refractive index distribution type are arranged in an array. A typical example of a commercially available rod lens array is SELFOC lens array (registered trademark. Nippon Sheet Glass), and in this case, a working distance (distance from a lens end surface to a focal point) is limited to 20 mm or less. In a case where the working distance is 20 mm or less, there is a high probability that the reading target object S comes into contact with the rod lens array and is damaged while conveyed, and therefore it is more preferable to use a rod lens array having a working distance of 30 mm or greater. For this purpose, it is preferable to independently create a rod lens array having a working distance of 30 mm or greater, or to adjust the working distance to 30 mm or greater by appropriately changing the pitch in the optical axis direction of a commercially available rod lens array (working distance 20 mm or less). As described earlier, in addition to the rod lens, an erecting equal magnification lens having a long focal length and few aberrations may be arranged in an array.

The imaging optical system 31 may be provided with an optical filter such as an infrared cut filter so that unnecessary light such as infrared light does not enter the light receiving element 32.

Next, an assembly structure of the optical line sensor 1 according to the first embodiment of the invention of the present application will be described with reference to FIG. 1B. At the both ends (both end surfaces) in the X direction, the illumination unit 2 is provided with protrusions 25 having a track-shaped cross section as fitting portions. The shape of the protrusion 25 is not limited to a track shape and is sufficient to be any shape other than a circular shape (point symmetrical shape). The protrusion 25 may be provided integrally with the illumination unit 2 or provided by attaching a separate body. Preferably, the illumination unit 2 can be removed without removing the holding member 4 as long as the protrusion 25 is provided so as to be movable in the X direction to change a protrusion amount.

The holding members 4 having a plate shape are attached to the illumination unit 2 at both ends in the X direction by fixing tools such as screws. The light receiving unit 3 and the holding members 4 may be positioned through a positioning pin not illustrated or the like. Each of the holding members 4 is provided with a hole 41 as a fitted portion to be fitted with the protrusion 25. The shape of the hole 41 is compatible with the shape of the protrusion 25, and the protrusion 25 is fitted into the hole 41, whereby the illumination unit 2 is fixed to the holding member 4 so as not to be displaced. The position (including the angle) of the hole 41 is set such that the irradiation optical axis A1 of the illumination unit 2 substantially intersects the reading line L of the light receiving unit 3 and has a desired intersection angle (illumination angle) when the protrusion 25 is fitted into the hole 41. That is, in the state where the protrusion 25 is fitted in the hole 41, the irradiation optical axis A1 of the light emitted from the illumination unit 2 overlaps the light receiving optical axis A2 at a position substantially coinciding with the reading line L. The position substantially coinciding with the reading line L is not limited to the position (on the reading line L) of the focal point of the imaging element and may conceptually include a position slightly (for example, about several mm) deviated in the Z direction with respect to the focal point. In order to change the illumination angle, it is sufficient to replace the position (including the angle) of the hole 41 with another holding member created by setting the irradiation optical axis A1 of the illumination unit 2 to substantially intersect the reading line L of the light receiving unit 3 and to have an intersection angle (illumination angle) desired to be changed.

2. Second Embodiment

Figure 2:
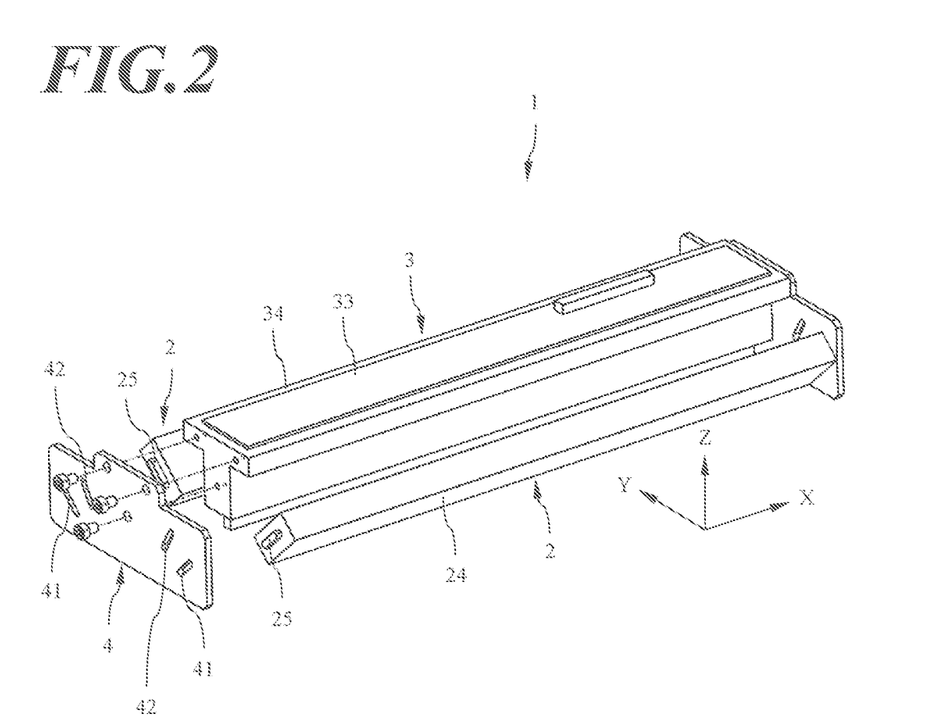
FIG. 2 is an exploded perspective view of an optical line sensor according to a second embodiment.

Next, the configuration of the optical line sensor 1 according to the second embodiment of the invention of the present application will be described. FIG. 2 is an exploded perspective view of the optical line sensor 1 according to the second embodiment. Since the configuration other than the assembly structure of the optical line sensor 1 is similar to that of the first embodiment, the detailed description of the similar configuration is omitted. FIG. 2 shows a case where a plurality of fitted portions are provided.

In the second embodiment, the configuration of the illumination unit 2 is the same as that of the second embodiment, but each of the holding members 4 is provided with two fitted portions, i.e., the hole 41 and a hole 42, as fitted portions to be fitted to the protrusion 25 of the illumination unit 2. The two holes 41 and 42 have the same shape, and both are compatible with the shape of the protrusion 25. The positions (including the angles) of the two holes 41 and 42 are set such that the irradiation optical axis A1 of the illumination unit 2 substantially intersects the reading line L of the light receiving unit 3 and has a desired different intersection angle (illumination angle) when the protrusion 25 is fitted into each of the holes 41 and 42. That is, even in a state where the protrusion 25 is fitted in any of the holes 41 and 42, the irradiation optical axis A1 of the light emitted from the illumination unit 2 overlaps the light receiving optical axis A2 at a position substantially coinciding with the reading line L. In order to change the illumination angle, it is sufficient to change the holes 41 and 42 to which the protrusion 25 is fitted, and replacement of the holding member 4 becomes unnecessary. Here, two fitted portions (holes) are provided, but the more the number of fitted portions is, the more the changeable illumination angle increases, and therefore three or more fitted portions are more preferable.

As described above, in the case of the first embodiment, the illumination angle can be finely changed by appropriately changing the holding member 4, and in the case of the second embodiment, the illumination angle can be changed without changing the holding member 4.

3. Third Embodiment

Figure 3:
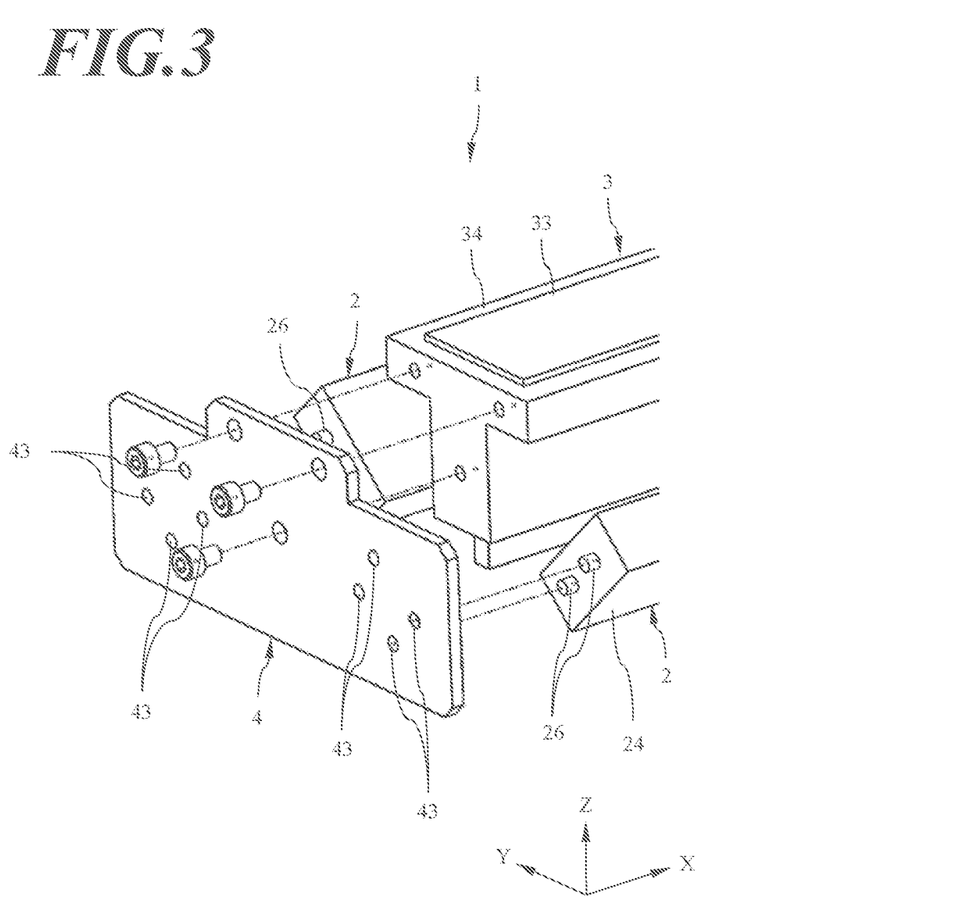
FIG. 3 is an exploded perspective view of an optical line sensor according to a third embodiment.

Next, the configuration of the optical line sensor 1 according to the third embodiment of the invention of the present application will be described with reference to FIG. 3. FIG. 3 is an exploded perspective view of the optical line sensor 1 according to the third embodiment. Since the configuration other than the assembly structure of the optical line sensor 1 is similar to that of the first embodiment, the detailed description of the similar configuration is omitted.

In the third embodiment, the illumination unit 2 is provided with a pair of protrusions 26 as fitting portions at each of both ends in the X direction. Each of the protrusions 26 is formed in a columnar shape. Each of the protrusions 26 may be provided integrally with the illumination unit 2 or provided by attaching a separate body. Preferably, the illumination unit 2 can be removed without removing the holding member 4 as long as each protrusion 25 is provided so as to be movable in the X direction to change a protrusion amount. Each of the holding members 4 is provided with a pair of holes 43 (two pairs) as fitted portions to be fitted with the pair of protrusions 26. The shape of the pair of holes 43 is formed in a circular shape compatible with the shape of the pair of protrusions 26, and the pair of protrusions 26 are fitted into the pair of holes 43, whereby the illumination unit 2 is fixed to the holding member 4 so as not to be displaced. When the pair of protrusions 26 are fitted into the pair of holes 43, the positions of the pair of holes 43 are set such that the irradiation optical axis A1 of the illumination unit 2 substantially intersects the reading line L of the light receiving unit 3 and has a desired intersection angle (light irradiation angle). Here, two (two pairs) fitted portions (pair of holes 43) are provided, but one (one pair) or three (three pairs) or more may be provided.

According to this configuration, the fitted portion can be obtained just by forming a drilled hole, preferably a reamer hole, at an appropriate position of the plate-shaped holding member 4, and therefore the manufacturing cost can be suppressed.

4. Fourth Embodiment

Figure 4:
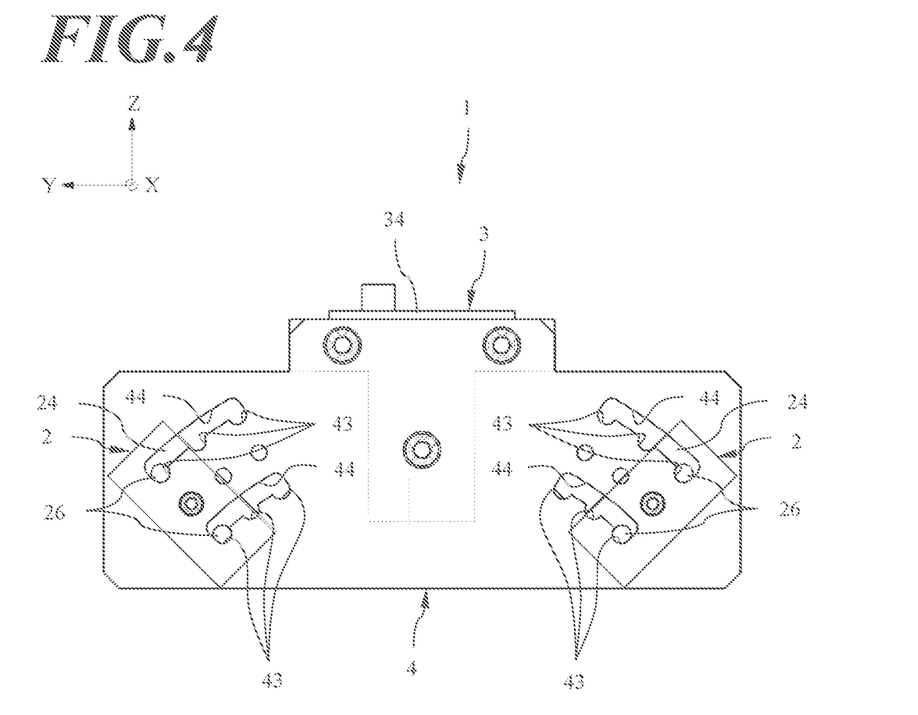
FIG. 4 is a side view of an optical line sensor according to a fourth embodiment.

Next, the configuration of the optical line sensor 1 according to the fourth embodiment of the invention of the present application will be described with reference to FIG. 4. FIG. 4 is a side view of the optical line sensor 1 according to the fourth embodiment. Since the configuration other than the assembly structure of the optical line sensor 1 is similar to that of the first embodiment, the detailed description of the similar configuration is omitted.

In the fourth embodiment, a plurality of fitted portions (pair of holes 43) provided in each of the holding members 4 in the third embodiment are connected to each other via connection holes 44. Here, three fitted portions (pair of holes 43) are provided, and the three holes 43 to which one protrusion 26 is fitted are connected by the connection hole 44, and the three holes 43 to which the other protrusion 26 is fitted are also connected by another connection hole 44. This allows the fitting portion (pair of protrusions 26) to move to each of the plurality of fitted portions (pair of holes 43) via the connection hole 44. However, the number of fitted portions (pair of holes 43) is not limited to three (three pairs), and may be two (two pairs) or four (four pairs) or more.

According to this configuration, it is not necessary to remove the illumination unit 2, and when the illumination unit 2 is slid along the YZ plane, the light irradiation angle can be changed. When the optical line sensor 1 is installed such that gravity is applied in the downward direction of FIG. 4, there is no problem because the fitting portion and the fitted portion are naturally fitted due to the own weight of the illumination unit 2, but, otherwise, the holding members 4 and the illumination unit 2 may be thread-engaged while supporting the illumination unit by a means not illustrated in a state where the fitting portion and the fitted portion are fitted.

5. Fifth Embodiment

Figure 5:
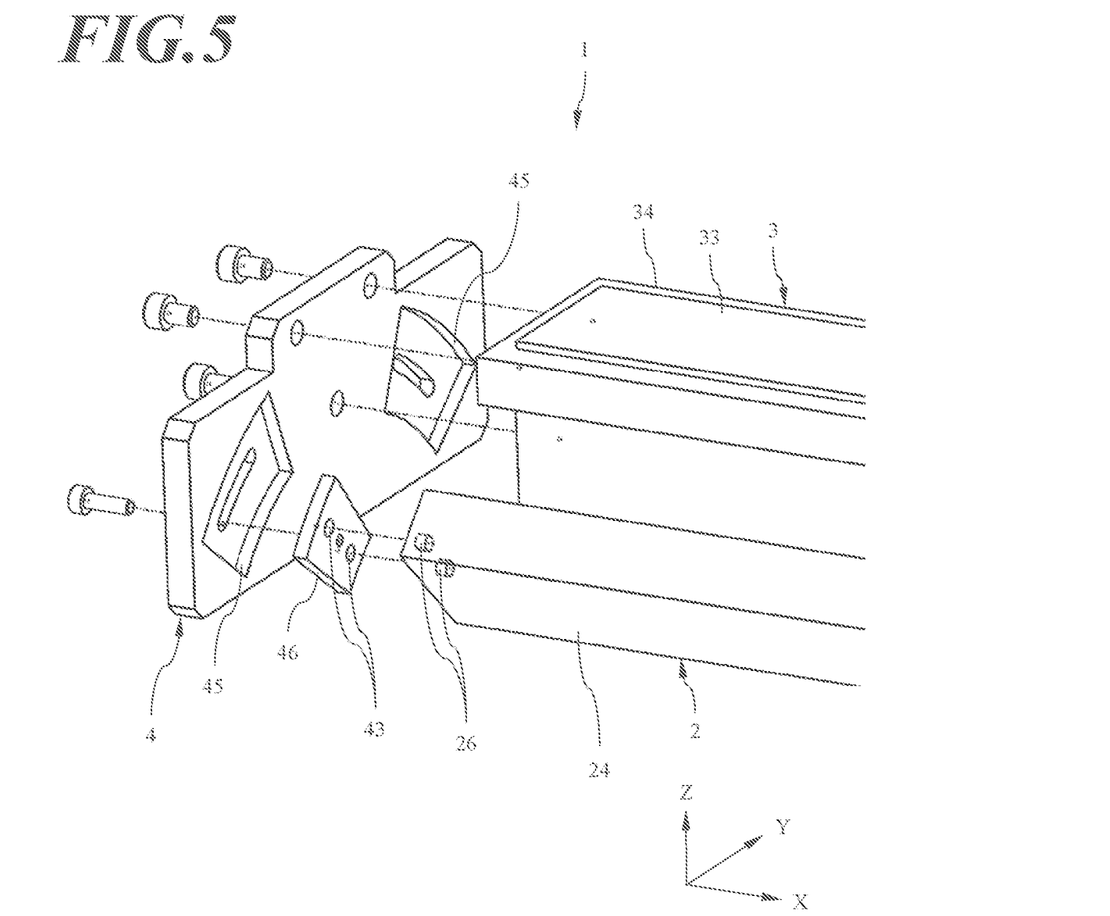
FIG. 5 is an exploded perspective view of an optical line sensor according to a fifth embodiment.

Next, the configuration of the optical line sensor 1 according to the fifth embodiment of the invention of the present application will be described with reference to FIG. 5. FIG. 5 is an exploded perspective view of the optical line sensor 1 according to the fifth embodiment. Since the configuration other than the assembly structure of the optical line sensor 1 is similar to that of the first embodiment, the detailed description of the similar configuration is omitted.

In the fifth embodiment, the illumination unit 2 is provided with the pair of protrusions 26 similarly to FIG. 3 at each of both ends in the X direction. Each of the protrusions 26 may be provided integrally with the illumination unit 2 or provided by attaching a separate body. The holding member 4 is provided with a fan-shaped recess 45 as a fitted portion, and provided with, as a fitting portion, a fan-shaped movable body 46 sliding in an arc shape along the recess 45. The position of the fan-shaped recess 45 is set such that the center of the arc (fan) of the fan-shaped recess 45 substantially coincides with the reading line L of the light receiving unit 3 in a state where the holding member 4 is attached to the light receiving unit 3. It is more preferable to position the light receiving unit 3 and the holding member 4 via a positioning pin not illustrated or the like because this leads to an increase in positioning accuracy.

The movable body 46 is a member constituting a part (end) of the illumination unit 2 and provided with the pair of holes 43 to be fitted with the protrusions 26. The shape of the pair of holes 43 is formed in a circular shape compatible with the shape of the pair of protrusions 26, and the pair of protrusions 26 are fitted into the pair of holes 43, whereby the movable body 46 is fixed to the illumination housing 24 so as not to be displaced. The positions of the pair of holes 43 are set such that the center of the arc (fan) of the fan-shaped movable body 46 substantially coincides with the center of the arc (fan) of the fan-shaped recess 45 in a state where the movable body 46 is fitted to an optional position in the recess 45. Due to this, the fitting portion (movable body 46) is slidably fitted to the fitted portion (recess 45) within a predetermined range, and the fitting portion can be fixed by a fixing tool such as a screw at an optional position within a predetermined range (within the range of the central angle of the fan-shaped recess 45). Even in a state where the fitting portion (movable body 46) is fixed to the fitted portion (recess 45) at any position within the predetermined range, the irradiation optical axis A1 of the light emitted from the illumination unit 2 overlaps the light receiving optical axis A2 at a position substantially coinciding with the reading line L.

According to this configuration, when the fitting portion (movable body 46) of the illumination unit 2 is fitted to the fitted portion (recess 45) of the holding member 4, the illumination unit 2 is supported so that the light irradiation angle can be changed, and all the irradiation optical axes A1 of the illumination unit 2 in the reading line L direction and the reading line L of the light receiving unit 3 always substantially coincide with each other at any light irradiation angle. When the holding member 4 and the movable body 46 are fastened with a screw at a desired light irradiation angle, the illumination unit 2 is fixed. It is also possible to finely adjust the light irradiation angle by adding a fine movement mechanism such as a feed screw not illustrated so that the light irradiation angle can be changed steplessly.

6. Sixth Embodiment

Figure 6:
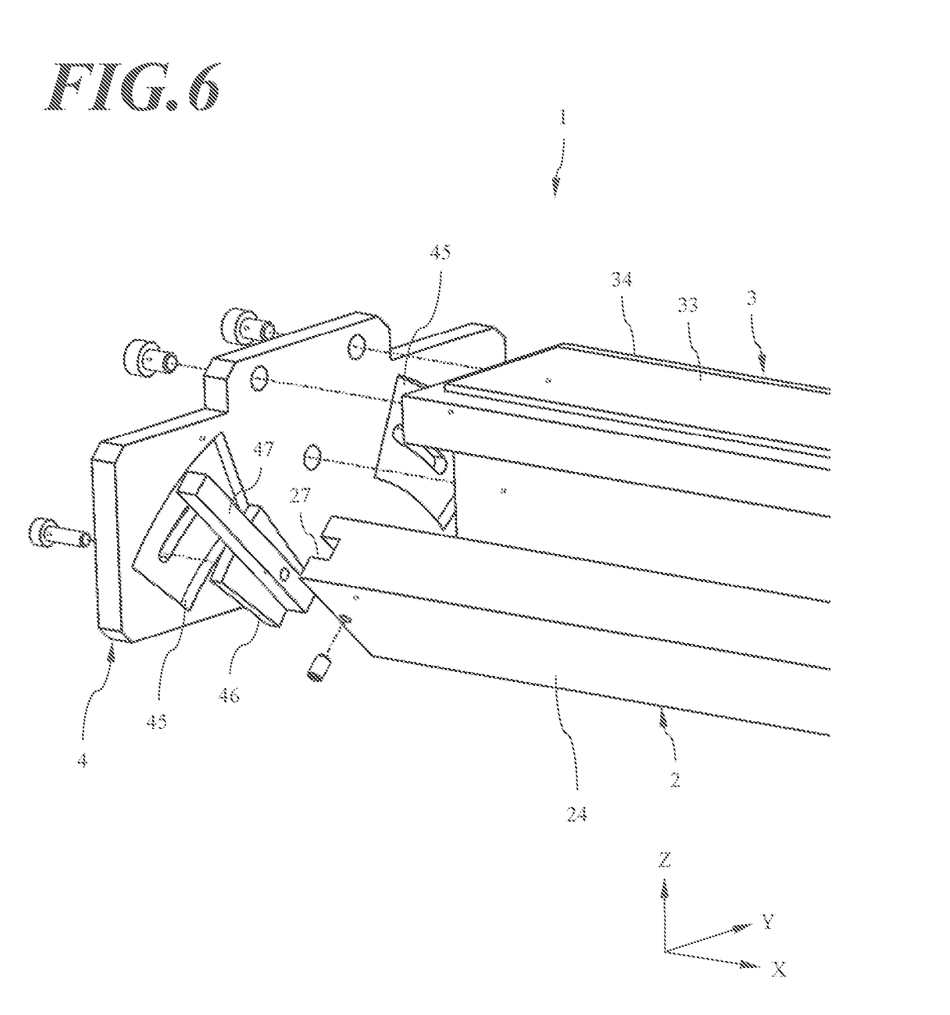
FIG. 6 is an exploded perspective view of an optical line sensor according to a sixth embodiment.

Next, the configuration of the optical line sensor 1 according to the sixth embodiment of the invention of the present application will be described with reference to FIG. 6. FIG. 6 is an exploded perspective view of the optical line sensor 1 according to the sixth embodiment. Since the configuration other than the assembly structure of the optical line sensor 1 is similar to that of the first embodiment, the detailed description of the similar configuration is omitted.

In the sixth embodiment, similarly to FIG. 5, the holding member 4 is provided with the fan-shaped recess 45 as a fitted portion, and provided with, as a fitting portion, the fan-shaped movable body 46 sliding in an arc shape along the recess 45. The position of the fan-shaped recess 45 is set such that the center of the arc (fan) of the fan-shaped recess 45 substantially coincides with the reading line L of the light receiving unit 3 in a state where the holding member 4 is attached to the light receiving unit 3. The light receiving unit 3 and the holding member 4 may be accurately positioned through a positioning pin not illustrated or the like. The movable body 46 is provided with a rectangular parallelepiped protrusion 47 extending in a radial direction of the arc (fan) of the fan-shaped movable body 46. The rectangular parallelepiped protrusion 47 may be provided integrally with the movable body 46 or provided by attaching a separate body.

At both ends in the X direction, the illumination unit 2 is provided with a groove 27 sliding along the rectangular parallelepiped protrusion 47. The groove 27 may be provided integrally with the illumination unit 2 or provided by attaching a separate body. The protrusion 47 and the groove 27 slidable with each other constitute an irradiation position adjustment mechanism for adjusting the position of the illumination unit 2 in the irradiation optical axis A1 direction, and each of the holding members 4 is attached to the illumination unit 2 via this irradiation position adjustment mechanism.

According to this configuration, when the fitting portion of the illumination unit 2 is fitted to the fitted portion, the illumination unit 2 is supported so that the light irradiation angle and irradiation distance can be changed, and all the irradiation optical axes A1 of the illumination unit 2 in the reading line L direction and the reading line L of the light receiving unit 3 always substantially coincide with each other at any light irradiation angle and irradiation distance. When the holding member 4 and the movable body 46 are fastened with a screw at a desired light irradiation angle, and the illumination unit 2 and the movable body 46 are fastened with a fixing tool such as a screw (preferably a set screw) at a desired irradiation distance, the illumination unit 2 is fixed. Since it is possible to steplessly change the light irradiation angle and irradiation distance, it is possible to finely adjust the light irradiation angle and irradiation distance by adding a fine movement mechanism such as a feed screw not illustrated.

7. Seventh Embodiment

Figure 7:
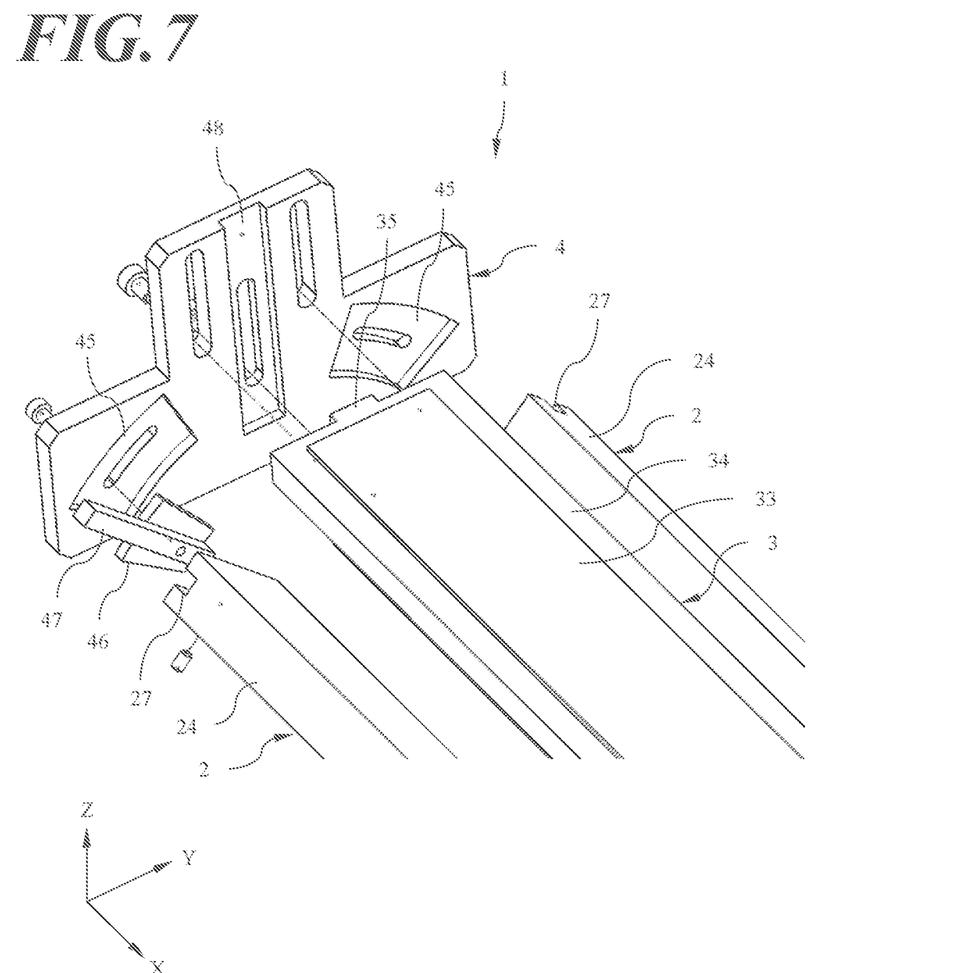
FIG. 7 is an exploded perspective view of an optical line sensor according to a seventh embodiment.

Next, the configuration of the optical line sensor 1 according to the seventh embodiment of the invention of the present application will be described with reference to FIG. 7. FIG. 7 is an exploded perspective view of the optical line sensor 1 according to the seventh embodiment. The seventh embodiment is different from the sixth embodiment in a method of attaching the holding member 4 to the light receiving unit 3. The other configurations are similar to those of the sixth embodiment, and thus detailed description of the similar configurations is omitted.

At both ends in the X direction, the light receiving unit 3 is provided with a rectangular parallelepiped protrusion 35 extending in the light receiving optical axis A2 direction. The rectangular parallelepiped protrusion 35 may be provided integrally with the light receiving housing 34 or provided by attaching a separate body. Each of the holding members 4 is provided with a groove 48 sliding along the rectangular parallelepiped protrusion 35. The protrusion 35 and the groove 48 slidable with each other constitute a light receiving position adjustment mechanism for adjusting the position of the light receiving unit 3 in the light receiving optical axis A2 direction, and each of the holding members 4 is attached to the light receiving unit 3 via this light receiving position adjustment mechanism.

According to this configuration, since the reading line L can be moved in the light receiving optical axis A2 direction, even in a case where the working distance (position of the reading line L in the light receiving optical axis A2 direction) is changed by replacing the imaging optical system 31 or the like, all the irradiation optical axes A1 of the illumination unit 2 in the reading line L direction and the reading line L of the light receiving unit 3 can be made substantially coincident with each other. When the holding member 4 and the light receiving unit 3 are engaged with a fixing tool such as a screw in a state where all the irradiation optical axes A1 of the illumination unit 2 in the reading line L direction and the reading line L of the light receiving unit 3 substantially coincide with each other, the positions thereof can be fixed. Since it is possible to steplessly change the position of the reading line L in the Z direction, by adding a fine movement mechanism such as a feed screw not illustrated, it is also possible to further improve the degree of coincidence between all the irradiation optical axes A1 of the illumination unit 2 in the reading line L direction and the reading line L of the light receiving unit 3.

8. Modification

In the above embodiments, the case where the fitting portion provided in the illumination unit 2 and the fitted portion provided in each of the holding members 4 are configured by the recess and protrusion fitted to each other has been described. However, the present invention is not limited to such a configuration, and the fitting portion and the fitted portion may have any other configuration as long as they can be fitted to each other.

In the above embodiments, the configuration in which light emitted from the illumination unit 2 is reflected by the reading target object S along the light receiving optical axis A2, and the reflected light is received by the light receiving unit 3 has been described. However, the present invention is not limited to such a configuration, and the illumination unit 2 and the light receiving unit 3 may be configured such that the reading target object S passes therebetween, light emitted from the illumination unit 2 is transmitted along the light receiving optical axis A2 through the reading target object S, and the transmitted light is received by the light receiving unit 3.

DESCRIPTION OF REFERENCE SIGNS 1 optical line sensor
2 illumination unit
3 light receiving unit
4 holding member
21 LED
22 LED substrate
23 condenser lens
24 illumination housing
25 protrusion
26 protrusion
27 groove
31 imaging optical system
32 light receiving element
33 light receiving substrate
34 light receiving housing
35 protrusion
41 hole
42 hole
43 hole
44 connection hole
45 recess
46 movable body
47 protrusion
48 groove
A1 irradiation optical axis
A2 light receiving optical axis

The invention claimed is:

1. An optical line sensor that reads, by a reading line extending in a main screening direction, a reading target object conveyed in a sub-scanning direction by a reading line extending in a main scanning direction, the optical line sensor comprising:
    an illumination unit that irradiates said reading target object with light;
    a light receiving unit that receives light emitted from said illumination unit and reflected by said reading target object along a light receiving optical axis or transmitted through said reading target object along said light receiving optical axis, photoelectrically converts said light, and outputs said light as an electric signal; and
    a pair of holding members separably attached to said light receiving unit at both ends in said main scanning direction;
    wherein said illumination unit further comprises:
        a fitting portion at said both ends in said main scanning direction;
        each of said pair of holding members further comprises a fitted portion to be fitted to said fitting portion of said illumination unit; and
        in a state where said fitting portion is fitted to said fitted portion, an irradiation optical axis of light emitted from said illumination unit overlaps said light receiving optical axis at a position substantially coinciding with said reading line.

2. The optical line sensor according to claim 1, wherein:
    each of said pair of holding members further comprises at least two of said fitted portions; and
    even in a state in which said fitting portion is fitted to any of said fitted portions, said irradiation optical axis of light emitted from said illumination unit overlaps said light receiving optical axis at said position substantially coinciding with said reading line.

3. The optical line sensor according to claim 2, wherein:
    each of said pair of holding members further comprises a connection hole connecting the at least two fitted portions to each other and said fitting portion is movable to each fitted portion via said connection hole.

4. The optical line sensor according to claim 1, wherein:
    said fitting portion is slidably fitted to said fitted portion within a predetermined range, and said fitting portion can be fixed at an optional position within said predetermined range; and
    even in a state in which said fitting portion is fixed to said fitted portion at any position within said predetermined range, an irradiation optical axis of light emitted from said illumination unit overlaps said light receiving optical axis at a position substantially coinciding with said reading line.

5. The optical line sensor according to claim 1, wherein:
    each of said pair of holding members is attached to said light receiving unit via a light receiving position adjustment mechanism for adjusting a position of said light receiving unit in said light receiving optical axis direction.

6. The optical line sensor according to claim 1, wherein:
   each of said pair of holding members is attached to said illumination unit via an irradiation position adjustment mechanism for adjusting a position of said illumination unit in said irradiation optical axis direction.

7. The optical line sensor according to claim 1, wherein:
   said light receiving unit further comprises:
   - an imaging optical system that images light emitted from said illumination unit and reflected by said reading target object along said light receiving optical axis or transmitted through said reading target object along said light receiving optical axis;
   - a light receiving element that receives light imaged by said imaging optical system, photoelectrically converts said light, and outputs said light as an electric signal;
   - a light receiving substrate on which said light receiving element is mounted and energized; and
   - a light receiving housing that integrally holds said imaging optical system and said light receiving substrate; and
   wherein said imaging optical system is a lens array in which erecting equal magnification imaging lenses are arranged in an array, and a working distance of said lens array is 30 mm or greater.

8. The optical line sensor according to claim 7, wherein:
   said lens is a refractive index distribution rod lens.

* * * * *